INVENTORS.
JOSEPH R. FLEMING and
THOMAS M. FLEMING
BY
Fishburn and Gold
ATTORNEYS United States Patent Office 3,383,002
Patented May 14, 1968

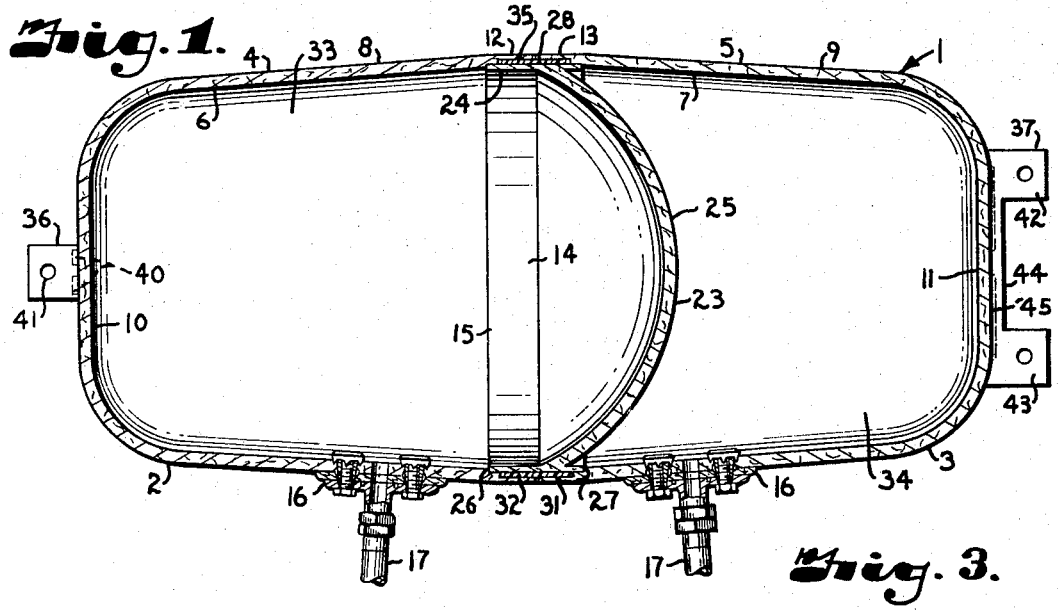
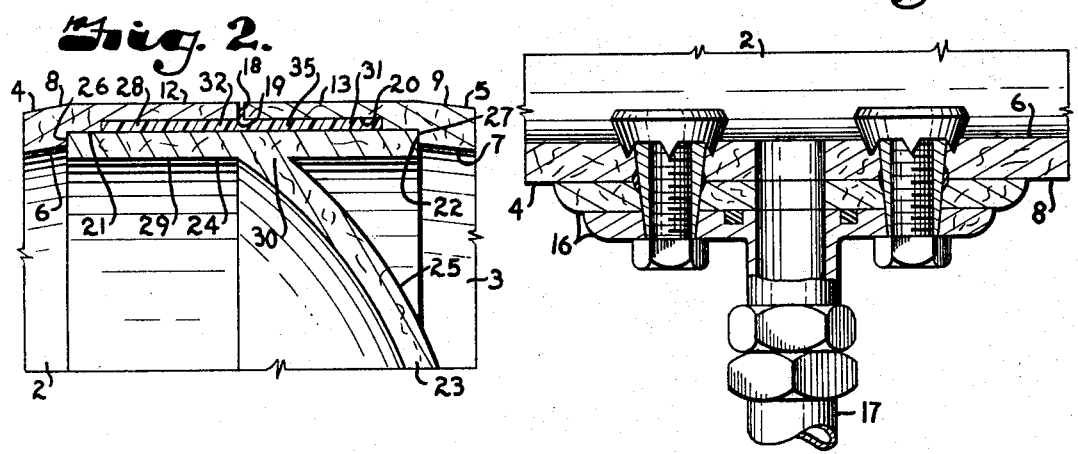
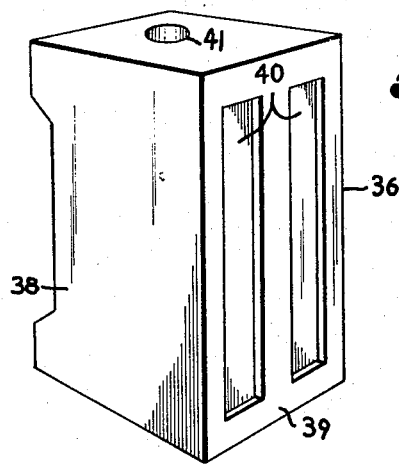
May 14, 1968 — T. M. FLEMING ET AL — 3,383,002
DOUBLE CHAMBER COMPRESSED FLUID RESERVOIR
Filed Aug. 15, 1966
INVENTORS.
JOSEPH R. FLEMING and
THOMAS M. FLEMING.
ATTORNEYS May 14, 1968   T. M. FLEMING ET AL   3,383,002
DOUBLE CHAMBER COMPRESSED FLUID RESERVOIR
Filed Aug. 15, 1966   2 Sheets-Sheet 2

3,383,002
DOUBLE CHAMBER COMPRESSED
FLUID RESERVOIR
Thomas M. Fleming, Leawood, and Joseph R. Fleming,
Prairie Village, Kans., assignors to T. J. Fleming Co.,
Kansas City, Mo., a corporation of Missouri
Filed Aug. 15, 1966, Ser. No. 572,433
7 Claims. (Cl. 220—5)

This invention relates to compressed fluid reservoirs and more particularly, to a double chamber reservoir of synthetic resin.

Compressed fluid reservoirs or pressure vessels are in common use. The vast majority of such vessels are of welded, riveted or bolted metal construction, although pressure vessels constructed of nonmetallic materials such as synthetic resin impregnated fiberglass are not unknown. In certain applications, for example, in railroad air brake mechanisms, to applicants' knowledge, metal tanks of a specialized standardized design have heretofore been used exclusively. Such vessels are composed of a pair of mating bowl portions with a domed separation plate therein for separating enclosed space into a pair of noncommunicating chambers, one being used as an auxiliary air reservoir and the other as an emergency air reservoir. These tanks each weigh approximately 250 pounds and in use, are exposed to severe operating conditions such as widely fluctuating environmental temperatures, rough handling, particle abrasion, corrosive chemicals, long periods of vibration and frequent heavy shock loading. In order to provide a long service life, such tanks are, therefore, formed of heavy durable metal and the fittings used to assemble the various parts are of high quality and liberally provided for high strength and endurance. Thus, multiple gaskets and sixteen sets of nuts and bolts are used for assembling the bowl portions to both sides of the separation plate. Considerable labor is required to properly assemble the tank and further difficulties result from relatively frequent disassembly which is necessary for gasket replacement or tank repair as well as the need for periodic inspection to insure that the bolts remain properly tightened.

The principal objects of the present invention are: to provide a double chamber compressed fluid reservoir of nonmetallic material which is suitable for railroad air brake mechanism application; to provide such a pressure vessel which weighs approximately one-sixth that of the standard metallic vessel but exhibits the required strength characteristics; to provide such a vessel which requires no gaskets, nuts or bolts with the attendant labor and inspection requirements associated therewith; to provide such a double chamber reservoir which is chemical and abrasion resistant and is relatively unaffected by frequent changes of environmental temperature; to provide such a vessel structure which exhibits high resistance to vibration and shock loading; and to provide such a pressure vessel assembly which is simple in design, relatively inexpensive to manufacture, exhibits a long useful life and is easily handled by one person.

Other objects and advantages of this invention will become apparent from the following description taken in connection with the accompanying drawings wherein are set forth by way of illustration and example certain embodiments of this invention.

FIG. 1 is a cross-sectional side elevation through a double chamber air reservoir embodying this invention.

FIG. 2 is a fragmentary cross-sectional view through the reservoir on an enlarged scale particularly showing the joint structure between reservoir members and a central separation member.

FIG. 3 is a fragmentary cross-sectional view through the reservoir on an enlarged scale particularly showing a port forming member communicating into a chamber.

FIG. 4 is a perspective view of a single lug used at one end of the reservoir and adapted to be adhesively secured thereto.

Figure 5:
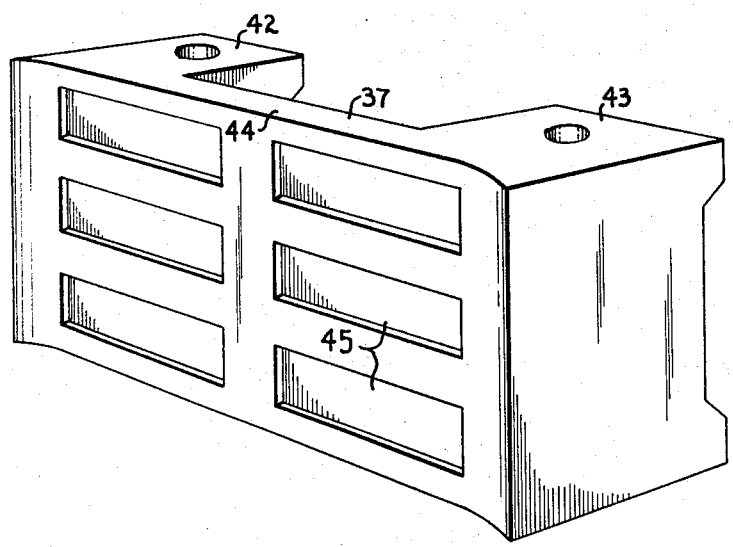
FIGS. 5 and 6 are perspective views of a double lug for use at the other end of the reservoir.

Referring to the drawings in more detail:

The reference numeral 1 generally indicates a double chamber air reservoir embodying this invention. This reservoir 1 comprises first and second cured resin bonded fiberglass tank members respectively designated 2 and 3. The tank members 2 and 3 are preferably produced from fiberglass rovings or chopped strands preformed on a screen using a suitable binder and then impregnated with a clear or pigmented polyester resin. It is contemplated that matched dies and high pressure press equipment adapted to cure the polyester under heat are most desirable for rapid production.

The members 2 and 3 preferably have generally cylindrical side walls 4 and 5 with inside surfaces 6 and 7, outside surfaces 8 and 9 and integral end walls 10 and 11. The members 2 and 3 respectively have cylindrical rim portions 12 and 13 defining open ends 14 and 15 opposed to the respective end walls 10 and 11. Suitable nipple securing structures 16 are mounted on the side walls 4 and 5 to provide access into the tank members 2 and 3 and permit securing conventional pressure hoses 17 thereto.

The rim portions 12 and 13 each terminate in circular edges 18 and 19 and have adjacent forward and intermediate cylindrical steps designated respectively 20 and 21 extending radially outwardly thereinto. The forward step 20 of the respective rim portions 12 and 13 encloses a greater diameter than the adjacent intermediate step 21 and extends to the respective edges 18 and 19. The intermediate steps 21 enclose a greater diameter than the side wall interior surfaces 6 and 7 adjacent thereto and form open end facing radial abutments 22 therewith.

A separation member 23, preferably of the same material and formed in the same way as the members 2 and 3, comprises a cylindrical annulus 24 and a dome-shaped wall 25. The annulus 24 has oppositely directed spaced apart circular edges 26 and 27, an outer surface 28 and an inner surface 29. The outer surface 28 has a diameter somewhat less than the diameter enclosed by the intermediate steps 21 but greater than the diameter enclosed by the side wall inside surface 6 and 7 adjacent the respective intermediate steps 21. The dome-shaped wall 25 covers the opening defined by the annulus 24 and has a circular peripheral edge 30 joining, and preferably integral with, the annular inner surface 29.

The edges 26 and 27 are respectively received within the rim portions 12 and 13 in positions engaging the respective radial abutments 22. It is noted that the sum of the distances between the abutments 22 and the circular edges 18 and 19 is less than the overall axial distance between the edges 26 and 27 whereby the circular edges 18 and 19 are slightly spaced apart when the annulus edges simultaneously engage the respective radial abutments 22, FIG. 2. The annulus outer surface 28 forms communicating adhesive receiving annular pockets 31 and 32 with the forward cylindrical steps 30. By inserting a suitable adhesive, such as epoxy resin, into the communicating pockets 31 and 32, the members 2 and 3 and the separation member 23 become assembled in mutually fixed relation with the separation member dividing the space enclosed by the members 2 and 3 into respective chambers 33 and 34.

Thus, the unique cooperation between the members 2, 3 and 23 permits a single ring 35 of adhesive to join the three major parts of the reservoir assembly into a high strength unitary structure without the need for gaskets and nuts and bolts or the like. The intermediate steps 21 and adjacent radial abutments 22 maintain the three members in the desired coaxial and longitudinal relationship with respect to each other while the adhesive is cured.

Figure 6:
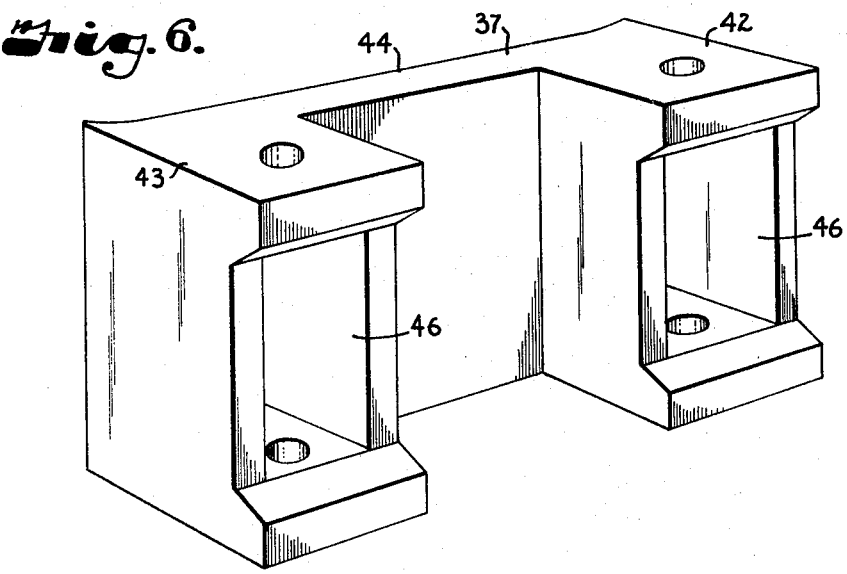

Mounting lugs for the reservoir are respectively designated 36 and 37. The mounting lug 36 comprises a single leg or projection 38 having an end wall 39 contoured to fit against the outer surface of the reservoir end wall 10. The wall 39 has a pair of spaced apart depressions 40 forming receiving pockets into which a suitable adhesive, such as epoxy resin, is deposited for adhesively securing the lug to the end wall. The lugs 36 and 37 are preferably formed of the same material and by the same process as the members above described but may require drilling at 41 for receiving bolts (not shown) to removably mount the reservoir on standard feet (not shown) provided on a railroad car. The mounting lug 37 is somewhat similar to the lug 36; however, it includes a pair of legs or projections 42 and 43 for receiving spaced apart mounting feet (not shown). A wall 44 of the mounting lug 37 is contoured to fit against the outer surface of the end wall 11 and has suitable elongated depressions 45 for the same purpose as the depressions 40 above noted. FIG. 6 illustrates at 46 the hollow nature of the respective projections 38, 42 and 43 for receiving the mounting feet (not shown).

It is to be understood that although one form of this invention has been illustrated and described, it is not to be limited thereto except insofar as such limitations are included in the following claims.

What we claim and desire to secure by Letters Patent is:

1. A double chamber reservor comprising:
 (a) first and second tank members, each having a rim portion defining an open end, means forming access ports into said first and second members,
 (b) a separation member comprising a peripheral portion and a wall, said peripheral portion defining an opening and having oppositely directed spaced apart edges and a surface therebetween,
 (c) said separaton member wall being secured to said peripheral portion and covering said opening, said peripheral portion edges being respectively telescoped past said rim portions, said surface being at least partially spaced from said rim portions and forming adhesive receiving pockets therewith, and
 (d) adhesive in said pockets whereby said first and second tank members and separation member are maintained in fixed assembled relation with said separation member dividing space enclosed by said first and second tank members.

2. The double chamber reservoir as set forth in claim 1 wherein:
 (a) said first and second tank members are constructed of synthetic resin impregnated fiberglass.

3. The double chamber reservoir as set forth in claim 1 wherein:
 (a) said rim portions are circular and each terminates in a circular edge, said rim portions each have adjacent forward and intermediate cylindrical steps extending radially outwardly thereinto,
 (b) said forward steps each enclosing a greater diameter than the intermediate step adjacent thereto and extending to said respective edge, said separation member peripheral porton comprising a cylindrical annulus, said peripheral portion surface having a diameter somewhat less than the inside diameter of said intermediate step for telescoping thereunder,
 (c) said annulus surface forming said adhesive receiving pockets with said forward cylindrical steps.

4. The double chamber reservoir as set forth in claim 3 wherein:
 (a) said pockets communicate with each other whereby said adhesive comprises an integral mass.

5. The double chamber reservoir as set forth in claim 4 wherein:
 (a) said tank members each have a generally cylindrical side wall with an inside surface,
 (b) said intermediate steps respectively enclosing a greater diameter than said side wall inside surfaces adjacent thereto forming radial abutments therewith,
 (c) said peripheral portion edges contacting said respective radial abutments whereby said tank members are longitudinally positioned with respect to said separation member and each other.

6. The air reservoir structure as set forth in claim 1 including:
 (a) mounting lugs each having a wall with depressions extending thereinto forming adhesive receiving pockets,
 (b) said walls corresponding in shape to selected exterior surfaces on said first and second members, and
 (c) adhesive in said depressions and adhesively securing said lugs to said first and second members on said selected surfaces.

7. The double chamber reservoir as set forth in claim 1 wherein:
 (a) said separation member is of synthetic resin and comprises a cylindrical annulus and a dome-shaped wall integral therewith and enclosing the opening defined thereby.

References Cited

UNITED STATES PATENTS

| | | | |
|---|---|---|---|
| 2,939,603 | 6/1960 | Young | 220—4 |
| 3,095,993 | 7/1963 | Balcom et al. | 220—5 |
| 3,195,760 | 7/1965 | Bulgrin | 220—22 X |

FOREIGN PATENTS

| | | |
|---|---|---|
| 660,757 | 11/1951 | Great Britain. |

THERON E. CONDON, *Primary Examiner.*

G. E. LOWRANCE, *Assistant Examiner.*